United States Patent [19]

Clements

[11] Patent Number: 4,705,461
[45] Date of Patent: Nov. 10, 1987

[54] TWO-COMPONENT METERING PUMP

[75] Inventor: George W. Clements, Minnetonka, Minn.

[73] Assignee: Seeger Corporation, St. Paul, Minn.

[21] Appl. No.: 287,836

[22] Filed: Jul. 29, 1981

Related U.S. Application Data

[63] Continuation of Ser. No. 76,901, Sep. 19, 1979, abandoned.

[51] Int. Cl.[4] .............................................. F04B 9/08
[52] U.S. Cl. ................................... 417/387; 417/388; 417/426; 417/499
[58] Field of Search ............... 417/386, 387, 273, 385, 417/269, 499, 383, 397, 395, 388, 413, 503, 426

[56] References Cited

U.S. PATENT DOCUMENTS

| | | | |
|---|---|---|---|
| 1,782,975 | 11/1930 | Schaer | 417/385 |
| 2,266,125 | 12/1941 | Malsbary et al. | 417/503 X |
| 2,439,879 | 4/1948 | Allen | 417/269 |
| 2,506,235 | 5/1950 | Nicolls | 417/387 |
| 2,752,854 | 7/1956 | Prior et al. | 417/388 |
| 2,948,223 | 8/1960 | Mashinter | 417/387 |
| 3,285,182 | 11/1966 | Pinkerton . | |
| 3,338,171 | 8/1967 | Conklin et al. | 417/395 X |
| 3,612,727 | 10/1971 | Drake . | |
| 3,715,174 | 2/1973 | Davis et al. | 417/413 X |
| 3,779,669 | 12/1973 | Sommer | 417/387 X |
| 3,918,846 | 11/1975 | Winkler | 417/387 X |

FOREIGN PATENT DOCUMENTS 1446031 8/1976 United Kingdom .
1512907 6/1978 United Kingdom .

*Primary Examiner*—Edward K. Look
*Attorney, Agent, or Firm*—Kinney & Lange

[57] ABSTRACT

A proportioning pump with tandem diaphragm pumps each having a pumpage chamber connected with a source of supply and a mixer and dispensing nozzle, a piston pump for operating each of the diaphragm pumps, a common eccentric drive for the pistons of the piston pumps, the piston pumps having cylinder wall sleeves extending into the hydraulic fluid reservoir, the sleeves having refill ports therethrough communicating between the pump chamber and the reservoir, one of the sleeves being longitudinally adjustable, a double threaded rotary control for the longitudinal adjustable cylinder wall sleeve, bypass pressure relief valves and passages for the hydraulic fluid from the pump chambers returning fluid to the reservoir in the event of excessive pressure, and the pump motor having a variable speed drive for widely varying the speed of the pump.

6 Claims, 6 Drawing Figures

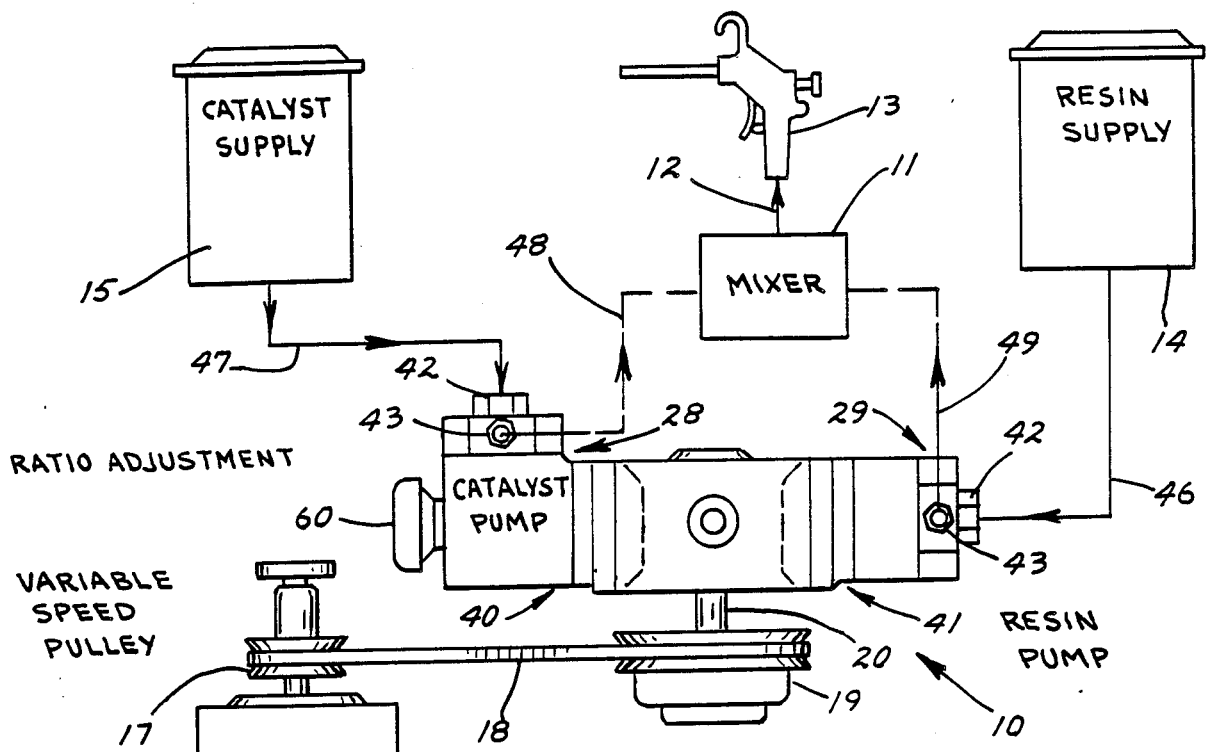
FIG. 1
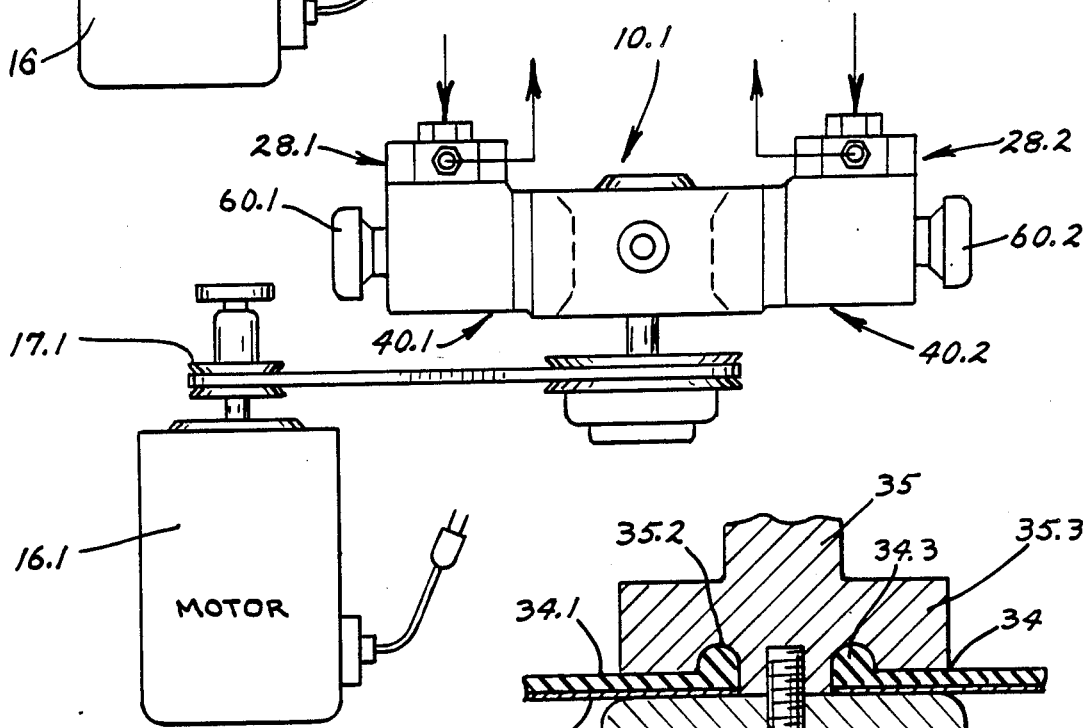
FIG. 3
FIG. 4

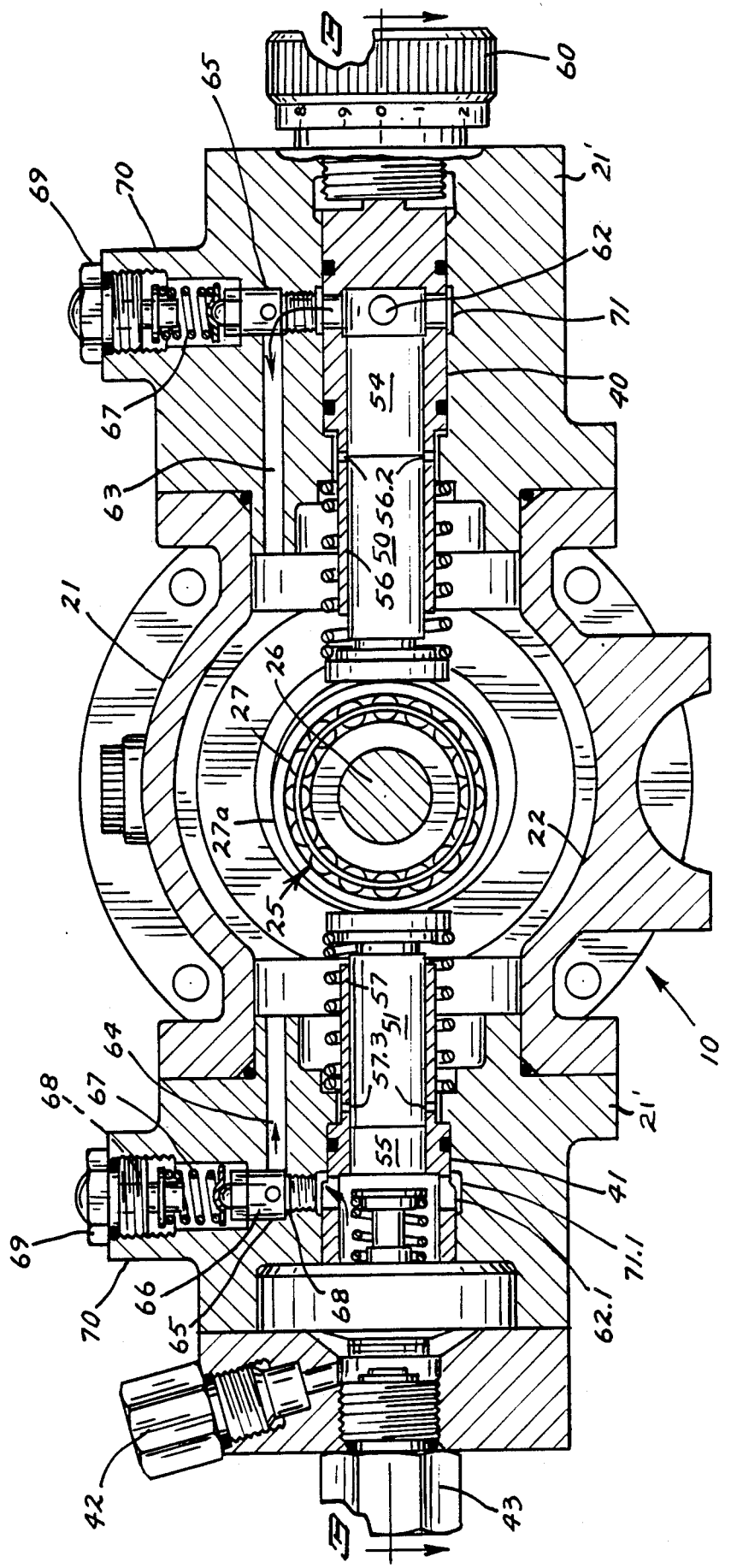

TWO-COMPONENT METERING PUMP

This is a continuation, of application Ser. No. 076,901 filed Sept. 19, 1979 now abandoned.

This invention relates to variable diaphragm type metering pumps, and more particularly, to an adjustable pump which is well adapted for accurately and adjustably supplying metered quantities of a two-component product.

BACKGROUND OF THE INVENTION

One common usage of metering pumps is in the measuring of components of multi-component products, such as paints, resins, and floor coverings, and also in adding small quantities of concentrate to water as in fertilizing and spraying herbicides onto crop fields.

It is readily apparent that with such widely different usages, numerous requirements are encountered as to make very substantial demands upon the capability of the pump.

Although a two-component metering pump has been known previously, inherent construction features clearly limit the usefulness in certain situations. Metering capability has been provided by mechanically limiting the return stroke of the piston. See U.S. Pat. No. 1,612,727. In limiting the return stroke of the piston, the piston encounters a mechanical stop which suddenly absorbs the inertia of the piston, any assemblies connected with it, and the diaphragm-operating hydraulic fluid or oil. The revolving cam will initially lift off the stopped piston and then impact the piston again to suddenly start it into motion. Depending upon the shape of the cam and the time in each cycle at which the cam reengages the piston, the repeated impact of the cam against the piston and the repeated impact of the piston against the stop can create substantial vibration in the pump.

Other single component diaphragm type metering pumps have used other types of mechanisms for varying the pumping rate. For instance, one pump has a port in the piston for suddenly releasing pressure in the cylinder at the end of the pressure stroke, as the piston port passes by the end of a stationary and adjustable rod, see U.S. Pat. No. 3,285,182. Another pump varies the length of stroke of the piston by varying the eccentricity of the driver for the piston, see U.S. Pat. No. 3,374,750. Such varying of eccentricity involves complicated mechanisms; and relying upon relief of developed pressure at the end of the pressure stroke requires a rather complicated mechanism and the developing of vacuum pressures on the return stroke which cause related complicating problems.

Still other diaphragm type pumps show the basic separation between the hydraulic fluid pumped by the reciprocating piston and the other liquid pumped by the diaphragm. Excess pressure under certain circumstances is relieved in various ways in these pumps and of course refilling of the cylinder after such relief is necessary. See U.S. Pat. Nos. 2,578,746; 3,075,468; 3,254,845; and 3,680,981.

BRIEF SUMMARY OF THE INVENTION

An object of the invention is to provide an improved two-component diaphragm pump to simply and effectively vary the quantities of components pumped over a wide range.

Another object of the invention is to provide in a two-component tandem diaphragm pump, a simple and readily variable control apparatus for changing the proportioning of the pumped liquid.

Still another object of the invention is the provision of a two-component tandem diaphragm pump and drive therefor adapted to vary the quantities of both liquids being pumped and also the proportion of the liquids as compared to each other.

A further object of the invention is the provision in a variable diaphragm pump of an adjustment control and proportion-varying apparatus facilitating extremely accurate adjustments of the quantities pumped and which adjustments are highly repeatable.

Still another object of the invention is to provide a tandem diaphragm pump incoporating long life and effectively sealing pumping diaphragms which resist the deteriorating effect of liquids being pumped.

An additional object of the invention is the provision of a two-component proportioning diaphragm pump which provides for relief of the pressures of the pumping hydraulic fluid when flow of the pumpage is suddenly stopped, and prevents relief of any of the pressure of the hydraulic fluid during normal operation and flow of the pumpage to the dispensing nozzle.

A principal feature of the present invention is the provision of the two-component proportioning pump having tandem diaphragm pumps each operated by a separate piston pump with a common drive and an adjustable sleeve forming the cylindrical wall of one of the piston pumps in order to obtain the desired proportioning at the diaphragm pumps.

Another principal feature of the invention is the provision of a two-component proportioning pump utilizing tandem diaphragm pumps and piston pumps to operate the diaphragm pumps, one of the pistons operating in an adjustable sleeve with a refill port therein communicating directly with the common reservoir of pumping oil, the sleeve extending well into the reservoir with its exterior exposed to the reservoir while the piston extends into the interior thereof.

Another feature of the present invention is the provision of a variable speed characteristic in the two-component proportioning pump for controlling the quantity of pumping by both of the diaphragm pumps and with control apparatus for changing the relative pumping capabilities of the two diaphragm pumps to obtain correct proportioning of the pumped liquid.

Another feature of the invention is the provision of a double thread adjusting arrangement on an adjustable sleeve forming the cylinder of a piston pump operating the diaphragm pump according to the present invention.

Another feature of the present invention is the provision of the two-component proportioning pump utilizing tandem diaphragm pumps which utilize diaphragms with a sandwich construction of Buna-N rubber at the oil side of the diaphragm and Teflon at the pumping side of the diaphragm to resist deteriorating effects of liquids being pumped and wherein the sandwiched diaphragm has annular inner and outer sealing beads confined in grooves in the housing and the piston-operated stem attachment.

Still another feature of the invention is to adopt a two-component proportioning pump utilizing diaphragm pumps, to be driven by either a rotary eccentric or by another fast acting reciprocating drive, such as a piston type pneumatic motor.

A principal advantage obtained by the present invention is the accurate varying of the proportions of the quantities of liquid being pumped over a wide range and permitting the quantities of both of the liquids to be varied considerably and without allowing any undesired vibrations to be set up in the pumping assembly, regardless of the pressures and speeds involved. With the present invention the quantities being pumped may be readily adjusted and repeated.

BRIEF DESCRIPTION OF DRAWINGS

FIG. 1 is a diagrammatic plan view illustrating the invention.

FIG. 2 is a longitudinal section view taken on an upright plane as indicated approximately at 2—2 in FIG. 3.

FIG. 4 is an enlarged detail section view taken approximately at 4—4 in FIG. 3.

FIG. 5 is a diagrammatic plan view showing a modified form of the invention.

DETAILED SPECIFICATION

Figure 3:
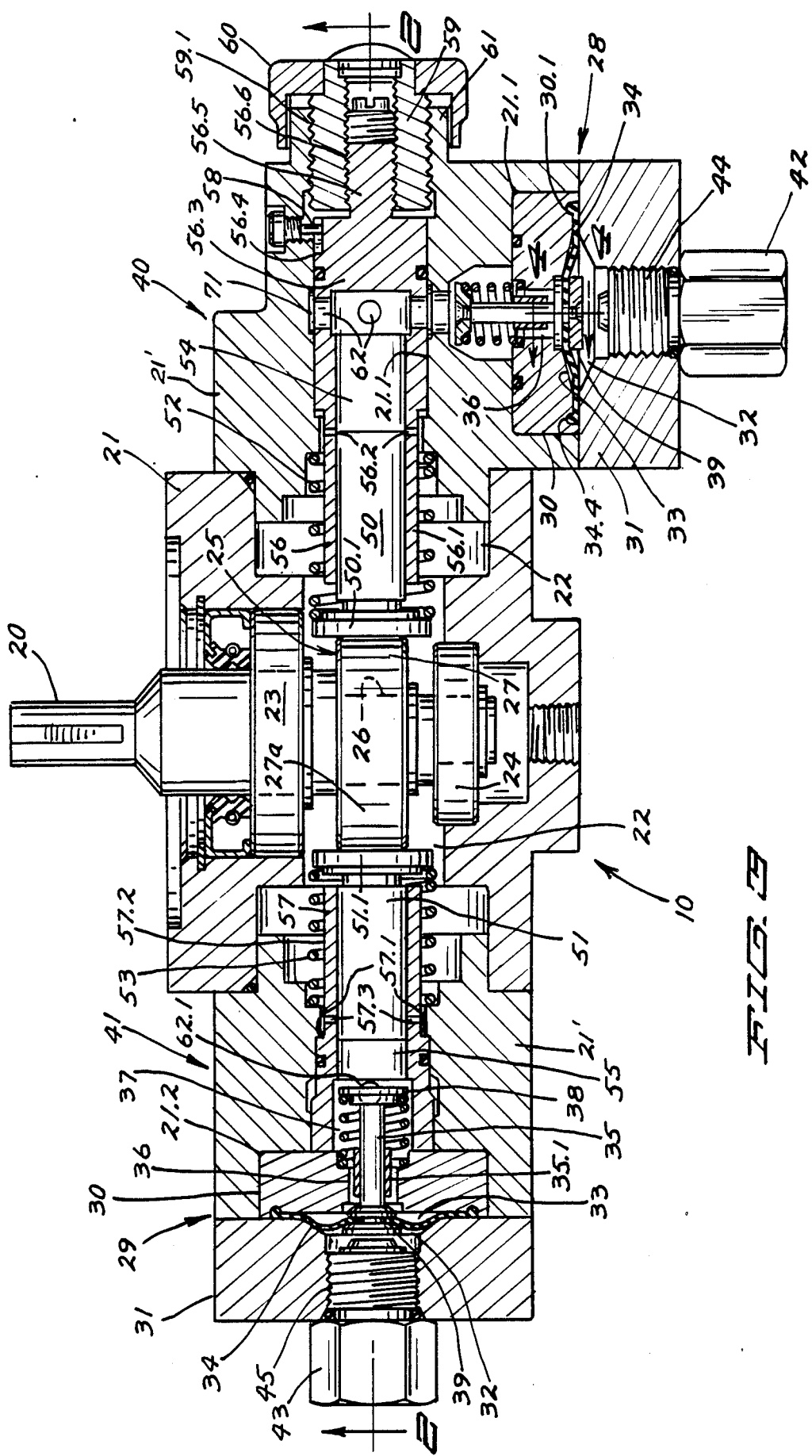
FIG. 3 is a longitudinal section view taken approximately at 3—3 in FIG. 2.

The variable two-component pump is indicated in general by numeral 10 and is illustrated in FIG. 1 to be typically used to supply the pumpage to a mixer 11 from which the mixed components are conveyed by a long hose 12 to an airless sprayer 13. It should be recognized that supplemental equipment may be employed between the pump 10 and the mixer 11, for accomplishing such functions as heating and filtering the pumpage. In one typical usage, resin is supplied from one source 14, and catalyst is supplied from another source tank 15.

A motor 16 provides a rotary source of power for the pump 10 and is connected through a variable speed pulley 17, belt 18, and pulley 19 to the input shaft 20 of the pump. In the form of pump illustrated in FIGS. 2 and 3, the pump 10 has a housing 21 which defines a central chamber 22 defining a reservoir for hydraulic fluid. The shaft 20 is mounted on bearings 23 and 24, and defines an eccentric 25 which includes an eccentric portion 26 of the shaft 20 which is embraced by a ball bearing 27, the outer annular peripheral surface 27a of which gyrates as an eccentric around the rotation axis of the shaft 20.

The pump 10 includes a pair of diaphragm pumps 28 and 29, and a pair of piston pumps 40 and 41.

The two diaphragm pumps 28 and 29 are essentially identical to each other, and identical reference numerals are used for both. The housing 21 has recesses 21.1 and 21.2 receiving the frame blocks 30 of the diaphragm pumps. End covers 31 are affixed to the housing 21 as by cap screws for capturing and clamping the frame blocks 30 in stationary position.

The diaphragm pumps 28 and 29 have pumpage chambers 32 and hydraulic fluid pumping chambers 33 on opposite sides of diaphrags 34.

A diaphragm stem 35 is attached by clamping to the center of the annular diaphragm 34, and extends into the supply duct 36 in frame block 30 which communicates with the hydraulic fluid chamber 33. A compression spring 37 has one end bearing against a shoulder in the frame block 30, and the outer end bearing against a washer 38 anchored to the free end of the diaphragm stem 35 as by retaining screw. The diaphragm stem 35 is guided by a stationary bearing sleeve 35.1 in the supply duct 36 and spaced from the frame block 30 by a spider-like mounting.

The diaphragms 34 are of annular and laminar construction, with a lamina 34.1 of neoprene rubber, facing the hydraulic fluid chamber 33, and a lamina 34.2 of a substantially inert plastic such as a plastic known by its trademark MYLAR, or of another plastic known by its trademark TEFLON, more specifically polyfluorotetraethylene.

The diaphragms 34 have annular beads 34.3 at their inner peripheries, and annular beads 34.4 at their outer peripheries.

The outer beads 34.4 of the diaphragms fit into annular grooves 30.1 in the frame blocks 30; and the inner beads 34.3 fit into annular grooves 35.2 formed in the clamping head 35.3 on the end of the diaphragm stem 35. The inner periphery of the diaphragm 34 is clamped against the head 35.3 by a clamping disc 39 retained onto the end of the diaphragm stem by a screw 39.1.

The pumpage chambers 32 of the diaphragm pumps 28 and 29 are connected through fittings 42 and 43 which are respectively provided with inflow and outflow check valves 44 and 45 through which the pumpage is directed into and out of the pumpage chambers 32. The fittings 42 are connected to supply flow lines 46 and 47 from the two sources of materials to be mixed; and the discharge fittings 43 are connected to the discharge hoses 48 and 49 which supply the components to the mixer 11.

The diaphragm pumps 28 and 29 are respectively operated by hydraulic fluid pumped from the piston pumps 40 and 41. The piston pumps 40 and 41 have reciprocating pistons 50 and 51 which have bearing heads 50.1 and 51.1 which bear against the peripheral surface 27a of the eccentric. Coil springs 52 and 53 bear at one end against a shoulder of the housing 21', and bear against the heads 50.1 and 51.1, respectively, of pistons 50 and 51 to continually urge the pistons against the peripheral surface of the eccentric.

The cylinders 54 and 55 in which the pistons 50 and 51 reciprocate are defined by cylinder wall sleeves 56 and 57, respectively. Cylinder wall 57 is stationary in the housing 21' and is clamped by the adjacent frame block 30 so that a shoulder 57.1 abuts against an adjoining shoulder in the housing 21'. A significant length of the inner end of the cylinder wall sleeve 57 extends into the hydraulic fluid reservoir 22 which surrounds the outer periphery 57.2 of the inner portion of the cylinder wall sleeve 57. A pair of ports 57.3 extend through the cylinder wall sleeve 57 and communicate at their inner ends with the pump chamber or cylinder 55, and at their outer ends with the reservoir 22.

It will be noted that the spring 53 closely embraces the outer periphery of the cylinder wall sleeve 57.

The inner end 56.1 of the cylinder wall sleeve 56 also extends a significant distance into the reservoir 22, and ports 56.2 through the cylinder wall sleeve 56 provide communication between the pumping chamber or cylinder 54 and the reservoir 22 at the outer periphery of the sleeve 56. Sleeve 56 is snugly mounted in a bore 21.1 of the housing and is longitudianlly slidable therein. The sleeve 56 has a closed head portion 56.3 which has a longitudinal keyway or groove 56.4 therein. A keying pin 58 is threaded in the housing 21 and extends into the keyway 56.4 for guiding the cylinder wall 56 in its longitudinal movement without permitting any rotation of the sleeve.

The cylinder wall sleeve 56 is provided with a stem 56.5 having threads 56.6 on its outer periphery. The stem 56.5 is threaded into a rotary control in the form of a sleeve 59 having a knurled head 60 affixed thereon. The rotary control 59 has a threaded exterior surface 59.1 which is threaded into a boss 61 formed integrally of the housing 21.

The threads at both the inner periphery and the outer periphery of the annular rotary control 59 are both righthand threads, but they have a different pitch. At the outer periphery of the rotary control 59, the threads by which the rotary control 59 is connected to the boss 61 of the housing has an 18 pitch in the form illustrated. The threads at the inner periphery of the rotary control and on the stem 56.5 have a 24 pitch. Accordingly, turning the rotary control 59 and 60 through a significant arc of rotation, will produce only a very limited endwise movement of the stem 56.5 and of the cylinder wall sleeve 56.

The cylinder wall sleeve 56 has a plurality of large flow ports 62 therethrough for open communication with the duct 36 which communicates with the hydraulic fluid chamber 33 of the adjacent diaphragm pump 28.

Pressure relief or bypass passages 63 and 64 are provided in the housing 21 to allow hydraulic fluid to return from the pump chambers 54 and 55 to the reservoir 21 under certain conditions, such as when the spray nozzle 13 is suddenly closed so as to prevent any pumpage from moving out of the pumpage chambers 32 of the diaphragm pumps. Pressure relief values 61 are provided in the bypass passages 63 and 64 and are substantially identical with each other. Each of the pressure relief values has a valve element 66 urged by a spring 67 against the valve seat 68 so as to keep the pressure relief valve 65 closed until pressure in the adjacent pump chamber exceeds a predetermined minimum. The tension on the spring 67 is maintained and adjusted by an anchor 68 threaded into a mounting plug 69 which is threadably connected to the boss 73 of the housing 21.

Communication is provided from the pump chamber 54 into the pressure relief valve 65 in the passage 63 through an annular manifold groove 71 in housing 21 and extending entirely around the outer periphery of cylinder wall sleeve 56 adjacent the ports 62. The manifold groove 71 also communicates with the duct 36 through which hydraulic fluid is supplied to the hydraulic fluid chamber 33 of the diaphragm pump 28.

The cylinder wall sleeve 57 has similar ports 62.1 which provides flow communication into an annular manifold groove 71.1 to allow the hydraulic fluid to enter the bypass passage and pass by the relief valve 65 in the event of excessive pressures.

In operation, the motor 16 is operated and the variable speed pulley 17 is adjusted as to produce rotation of the shaft 20 at a speed within the range of approximately 200 to 1200 rpm. The quantity of pumpage from the two diaphragm pumps 28 and 29 may be varied over a wide range by changing the speed of the drive shaft 20. Changing the speed will change the pumping rate of the two diaphragm pumps in substantially direct relation to the speed of the drive shaft. In addition, the pumping rate of the diaphragm pump 28 may be changed by adjusting the hand control 60 as to produce longitudinal relocation of the cylinder wall sleeve 56 and of the port 56.2.

As the shaft 20 revolves, the eccentric produces reciprocation of the pistons 50 and 51. The pistons are almost entirely confined in the cantiliver end portions of the cylinder wall sleeves 56 and 57 which project into the reservoir 22.

As the piston 50 progresses from the portion illustrated in FIGS. 2 and 3 in an outward direction along the cylinder wall sleeve 56, the leading face of the piston 50 will initially move across and then close the ports 56.2 in sleeve 56. Until the ports 56.2 are entirely closed, the pumping stroke of the piston pump 40 does not commence. At the instant the piston 50 closes the ports 56.2, pumping action commences, and the hydraulic fluid commences to flow through the ports 62 and duct 36 into the hydraulic fluid chamber 33 of diaphragm pump 28. As the hydraulic fluid in chamber 33 moves the diaphragm 34, pumping of the liquid in the pumpage chamber 32 commences, and continues until the eccentric completes the outward movement of the piston 50. As the piston 50 stops and then starts returning inwardly under the influence of spring 52, the spring 37 of diaphragm pump 28 draws the diaphragm toward its rest position; and simultaneously, the pumpage chamber 32 is again refilled with the liquid from the source 15.

Simultaneously as the eccentric is driving the piston 50 outwardly, and subsequently as the spring 52 returns the piston 50 to the position shown in FIGS. 2 and 3, the other piston 51 is also being moved. Initially, from the position illustrated in FIGS. 2 and 3, the piston is moved under the influence of spring 53 in an inward direction as the eccentric revolves to allow such inward movement. The movement of piston 51 permits the spring 37 to draw the diaphragm 34 toward the hydraulic fluid chamber 33, and simultaneously the pumpage chamber 32 is being enlarged to draw liquid from the source 14 for the next pumping stroke. During the normal operation of the pump while the nozzle 33 is open so that both of the diaphragm pumps 28 and 29 are fully operating, there will be no flow whatever through the bypass passages 63 and 64, and the valves 65 remain entirely closed. In this circumstance, there is essentially no flow through the ports 57.3 of cylinder wall sleeve 57 and ports 56.2 of cylinder wall sleeve 56, because there has been no loss of hydraulic fluid from the pump chambers 54, 55 during the normal operation of the piston pumps. If there is some small loss of hydraulic fluid due to seepage along the piston or otherwise, the hydraulic fluid in the pump chambers 54, 55 will be replenished during each stroke of the pistons through the ports 56.2 and 57.3.

The advantages of extending the cylinder wall sleeves 56 and 57 well into the reservoir 22 are numerous. The refill passages or ports 56.2 and 57.3 are extremely short, equaling the thickness of the cylinder wall sleeves 56 and 57. There is no need for purposes of the refill to utilize long and complicated passages in the housing 21. Construction of the piston pumps 40 and 41 is simple by virtue of the removable cylinder wall sleeves so that in the event any maintenance or adjustment as to cylinder and piston size is desired, the cylinder wall sleeves can be readily replaced. The proportions of the materials being pumped may be very accurately controlled by adjusting the rotary control 59, 60. The slightly different pitch on the threads at 56.6 and 59.1 allows the rotary control 60 to be revolved through a significant arc for a small amount of longitudinal movement of the sleeve. Because of the careful control of the longitudinal movement of sleeve 56, the rotary control 59, 60 can allow the setting of the sleeve to be repeated during sequential pumping operations. As illustrated in FIG. 2, a scale may be provided around the periphery of the hand wheel 60 and on the boss 61 to produce a vernier scale.

Some materials being pumped may vary from batch to batch or with the temperature conditions and the adjustment of cylinder wall sleeve 56 can minutely affect the quantity of material pumped by the diaphragm pump 28.

Simply changing the longitudinal position of the cylinder wall sleeve 56 causes the ports 56.2 to assume a new position so as to cause the piston 50 to change the phasing of closing of the port 56.2, whereupon to actually change the amount of hydraulic fluid moved in and out of the hydraulic fluid chamber 33 of the diaphragm pump.

In the event that the dispensing nozzle 13 is suddenly closed to stop the flow of the pumpage from the two diaphragm pumps 28 and 29, the hydraulic fluid from pump chambers 54 and 55 is no longer capable of moving the diaphragms 34, and accordingly, excessive pressures are immediately created in the pump chambers 54 and 55. The excessive pressures immediately cause the relief valves 65 to open to allow the hydraulic fluid to flow through the bypass passages 63 and 64 and return to the reservoir 22. The eccentric will continue to reciprocate the pistons 50 and 51, and a large proportion of the hydraulic fluid in the pump chambers 54 and 55 will be expelled through the bypass passages.

As soon as the dispensing nozzle 13 is again reopened, flow is permitted from the pumpage chambers 32 of the diaphragm pumps and hydraulic fluid will be drawn into the pump chambers 54 and 55 through the refill ports 56.2 and 57.3 so as to bring the piston pumps 40 and 41 back to fully operating condition within a few strokes. Similarly, the diaphragm pumps 28 and 29 will be operating at full capacity within a few strokes after the reopening of the valved dispensing nozzle 13.

In order to accommodate wide variance in the quantity of pumping desired and the proper proportioning of the components, the variable speed pulley 17 on the motor shaft may be adjusted to change the speed of the shaft 20 and of the eccentric and of the piston pumps.

During operation of the diaphragm pumps, the inner and outer peripheries of the diaphragms 34 are clamped and retained against undesired movement through the effective operation of the beads 34.3 and 34.4. The beads provide for extremely effective sealing to prevent any migration of pumpage or hydraulic fluid past the diaphragm.

The chemically resistant lamina 34.2 of each of the diaphragms permits pumping of an extremely wide range of materials with this proportioning pump. The lamina 34.2 is relatively thin compared to the neoprene rubber lamina 34.1, but is efficient to resist the effect of the pumpage liquids.

Although, in the form illustrated, the eccentric provides a camming peripheral surface 27a to transmit the reciprocating motion to the pistons 50 and 51 which are aligned with each other in the cylinder wall sleeves 56 and 57 which are also aligned with each other, it is readily understandable that each of the pistons may be, in an alternate form, connected by a piston rod directly to the eccentric of the drive shaft.

Furthermore, it should be recognized that although the form of the invention illustrated in FIGS. 1-4 has only one adjustable piston pump 40, wherein the cylinder wall sleeve 56 is longitudinally adjustable, in FIG. 5, the pump 10.1 incorporates two separate variable piston pumps 40.1 and 40.2, both of which are identical with the piston pump 40 illustrated in FIGS. 1-3. Each of the variable piston pumps 40.1 and 40.2 operates a corresponding diaphragm pump 28.1 and 28.2, each of which is identical to the diaphragm pump 28 illustrated in FIGS. 1-4 for pumping the components of the mixture. In FIG. 5 the motor 16.1 also has a variable speed pulley 17.1 for varying the operating speed of the pumps. Accordingly, a wide variation in the proportioning of materials being pumped can be obtained through varying the operation of the piston pumps through their controls 60.1 and 60.2 in the manner previously described in connection with the piston pump 40 of FIGS. 1-4.

Figure 6:
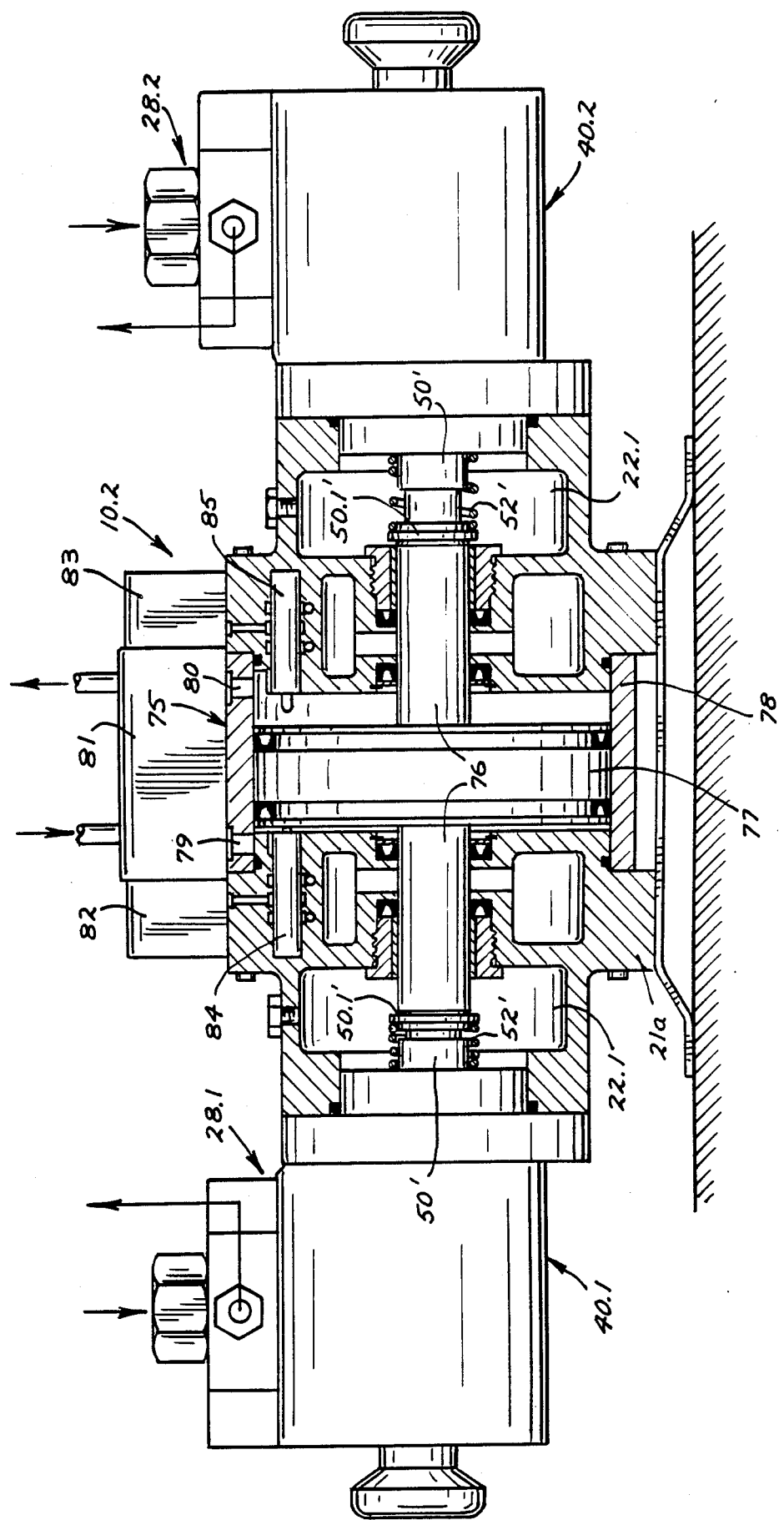
FIG. 6 is an elevation view, partly in section, of a modified form of proportioning pump.

In FIG. 6 the proportioning pump 10.2 incorporates the two piston pumps 40.1 and 40.2 of FIG. 5, and the diaphragm pumps 28.1 and 28.2 thereof. In this form, the source of reciprocating power is provided by a double acting piston type air motor 75. It should be obvious that the air motor 75 could also be used with the piston pumps 28 and 29 of FIG. 1 and the corresponding diaphragm pumps 28 and 29.

The heads 50.1' of pistons 50' of the piston pumps 40.1 and 40.2 are continuously urged against the adjacent ends of the piston rod 76 by springs 52'. Piston 77 on rod 76 reciprocates in cylinder 78, into which air under pressure is supplied and exhausted through ports 79 and 80 in the cylinder wall. Air is supplied to and exhausted from the ports by a four-way valve 81 having pilot operators 82 and 83 for shifting the valve. Piston position sensing valves 84, 85 control application of pressurized air to the pilot operators 82, 83 so as to synchronize the operation of the four way valve 81 with the reciprocation of piston 77 and rod 78.

Air motor 75 may be operated to reciprocate pistons 50' at the same rate and with the same effect as in the other forms of the invention.

Hydraulic fluid reservoirs 22.1 are provided in the air motor housing 21a so as to immerse the pistons 50' springs 52' and the cylinder sleeves for supplying hydraulic fluid into the pump chambers as herein described in connection with FIGS. 1-4. The reservoirs may be interconnected with passageways or conduits if desired.

In certain instances, it may be desirable to reduce the capacity of one of the piston pumps by utilizing a piston of smaller diameter, and a cylinder sleeve of corresponding size. In order to compensate for the varying loading at the air motor, the air piston and the cylinder wall therefor may both be stepped so as to have effectively different piston surface areas against which the pressurized air acts.

In another form of the invention, the pressure relief valves 65 may be entirely confined in a removable cartridge or capsule, so as to facilitate effectively eliminating the pressure relief valve from the hydraulic circuit during priming, and without losing a pre-established setting of the relief valve.

It will be seen that the invention provides a two-component proportioning and tandem diaphragm pump wherein the cylinder wall of one of the piston pumps may be longitudinally adjusted to change the pumping stroke of the piston pump and thereby vary the quantity of pumpage from the associated diaphragm pump. The pump may be operated as a single pump without requiring the use of the two components, but in most instances two components will be consistently pumped at the desired relative rates to each other.

What is claimed is:

1. In a pump system of the type having a diaphragm pump including a pumpage chamber and a hydraulic fluid chamber separated by a diaphragm, having pump means operating said diaphragm pump and including cylinder means and piston means defining a pumping chamber in communication with said hydraulic fluid chamber, said piston means being reciprocated within said cylinder means by a drive, and having a reservoir for hydraulic fluid and a housing for at least some of the system components, the improvement wherein said cylinder means comprises: cylinder wall sleeve means extending into said reservoir and a threaded stem extending toward said housing, said cylinder wall sleeve means being selectively movable in the directions of reciprocation of said piston means; port means extending through said cylinder wall sleeve means between said pumping chamber and reservoir, the piston means reciprocating across the port means to alternatively open and close the port means; and further comprising rotary control means threaded into said housing and extending to the interior of the housing and into engagement with the treads of said threaded stem, the threads between the housing and the rotary control means having a pitch different from the threads between the stem and the rotary control means.

2. The pump system of claim 1 wherein the threads between the housing and the rotary control means have a smaller pitch than the threads between the stem and the rotary control means.

3. The pump system of claim 1 further comprising a second diaphragm pump and second pump means operating said second diaphragm pump including cylinder means and piston means, the second pump means cylinder means including cylinder wall sleeve means and port means extending through said second pump means cylinder wall sleeve means to said reservoir means.

4. The pump system of claim 1 wherein said diaphragm comprises multiple laminations including a neoprene rubber lamination adjacent the hydraulic fluid chamber and a lamina of substantially chemically inert plastic facing the pumpage chamber.

5. In a two pump system for combined dispensing of the type having a common drive for said pumps, said pumps including diaphragm pumps each including a pumpage chamber and a hydraulic fluid chamber separated by a diaphragm and each diaphragm pump being operated by separate pump means each driven by said common drive and including cylinder means and piston means defining a pumping chamber in communication with said hydraulic fluid chamber, said piston means being reciprocated within said cylinder means by said drive, and a reservoir for hydraulic fluid, the improvement for proportioning a component pumped by one of said pumps relative to a component pumped by the other of said pumps for combined and controlld proportional dispensing of the two components pumped by said one and said other pumps without altering the travel of the piston means of said one pump means wherein the cylinder means of said one pump means comprises:

cylinder wall sleeve means extending into said reservoir and being selectively movable in the directions of reciprocation of said one pump piston means and port means extending through said cylinder wall sleeve means between said pumping chamber and reservoir, the piston means of said one pump reciprocating across the port means to alternatively open and close the port means and the position of said cylinder wall sleeve means establishing the proportion of the component pumped by said one pump relative to the component pumped by the other pump; and further comprising means selectively moving and retaining said cylinder wall sleeve means for altering the pumping stroke of said piston and normally closed pressure relief means interconnecting said reservoir and pumping chamber for opening in response to a pressure increase resulting from discontinued dispensing.

6. The two pump system of claim 5 wherein said common drive comprises variable speed drive means for altering the volume of the components pumped by said one and the other pumps without altering the relative proportion of components dispensed.

* * * * *